(12) United States Patent
Chen

(10) Patent No.: US 6,795,550 B1
(45) Date of Patent: Sep. 21, 2004

(54) ECHO CANCELLER

(75) Inventor: Tzong-Kwei Chen, Hsinchu Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/503,056

(22) Filed: Feb. 12, 2000

(30) Foreign Application Priority Data

Dec. 17, 1999 (TW) ........................................ 88122233 A

(51) Int. Cl.[7] ................................................ H04M 1/00
(52) U.S. Cl. ....................................................... 379/406
(58) Field of Search ........................ 379/406.01, 406.05, 379/406.06, 406.08, 406.09; 370/286; 455/570; 381/66

(56) References Cited

U.S. PATENT DOCUMENTS

| | | | |
|---|---|---|---|
| 5,263,020 A | * | 11/1993 | Yatsuzuka et al. .......... 370/289 |
| 5,305,309 A | * | 4/1994 | Chujo et al. ................. 370/290 |
| 5,463,618 A | * | 10/1995 | Furukawa et al. ........... 370/290 |
| 6,434,110 B1 | * | 8/2002 | Hemkumar ................... 370/201 |

* cited by examiner

Primary Examiner—Duc Nguyen
Assistant Examiner—Lun-See Lao
(74) Attorney, Agent, or Firm—J.C. Patents

(57) ABSTRACT

An echo canceller. The echo canceller having an adjust-type filter, an echo return loss enhancement device, a divergence detector and a double talk detector is suitable for use between a receiving line and an output line. After adjusting a coefficient via the adjust-type filter, the echo cancellation is performed. According to an acoustic input signal and an acoustic output signal, the echo return loss enhancement device outputs an adjusting signal. While receiving the adjusting signal as well as an external input signal, the divergence detector outputs a divergent/convergent signal. While receiving the external input signal, the adjusting signal and the divergent/convergent signal, the double talk detector outputs a control adjusting coefficient signal to the adjust-type filter. In this manner, with the addition of the divergence detector, the echo cancellation tends to be stablized.

15 Claims, 1 Drawing Sheet

ECHO CANCELLER

CROSS-REFERENCE TO RELATED APPLICATION

This application claims the priority benefit of Taiwan application serial no. 88122233, filed Dec. 17, 1999.

BACKGROUND OF THE INVENTION

1. Field of the Invention

The invention relates in general to an echo canceller, and more particularly, to a design of a divergence detector which converts the divergent state into a convergent state, so as to stably operate the echo canceller.

2. Description of the Related Art

An echo canceller is commonly used in a handset of a phone to eliminate unnecessary echo. For example, while transferring a two-line system to a four-line system in a telephone network, an echo occurs if the impedance matching is not met, or in the application of a speaker phone, the voice is reflected in the chamber-like space to produce an echo. However, the conventional echo canceller can only eliminate the echo in one direction. Only during a one-direction talk (the direction that produces the echo), the echo canceller may adjust a coefficient for eliminating the echo. However, while the coefficient is not ideally convergent, a double talk detector is required to detect the one-direction talk. Various kinds of methods to fabricate the double talk detector have been developed. In the following paragraphs, two common types of the double talk detectors are introduced.

As shown in FIG. 1, a conventional echo canceller 14 is coupled between a receiving line (input line) 10 and an output line 12. The receiving line 10 has a terminal used as a first input terminal 16 for receiving an external input signal Rin, and a terminal used as a first output terminal 18 for an external output signal Rout. The output line has a terminal used as a second input terminal 20 for an acoustic input signal Sin, and a terminal used as a second output terminal 22 for an acoustic output signal Sout. The external output signal Rout is output via a receiving set 24, while the microphone 26 outputs the acoustic input signal Sin at the second input terminal 20. Between the receiving set 24 and the microphone 26, the output signal of the receiving set 24 overlaps with the acoustic input signal Sin to cause an echo 28. Meanwhile, the double talk detector of the echo canceller has to start detecting to effectively eliminate the echo 28.

For a first type of double talk detector in a echo canceller, while the acoustic input signal Sin has a magnitude larger a half of the external output signal Rout, it is thus determined as a double talk that immediately freezes the coefficient adjustment of the echo cancller. This method can be applied as a line echo canceller. However, this kind of echo canceller can not be applied to an echo canceller required for a receiving set since the distance between the speaker and the microphone is variable to cause variable magnitudes of echoes.

A second type of the double talk of an echo canceller is to determine according to the value of echo return loss enhancement (ERLE), wherein ERLE=Sin/Sout When ERLE is larger than a certain constant, the echo coefficient is adjusted. In this manner, ERLE can effectively determine while the coefficient is convergent. However, before being convergent, an error can be caused to latch up the coefficient of the echo cancellation. The echo coefficient thus can never be converged.

SUMMARY OF THE INVENTION

The invention provides an echo canceller. The echo canceller comprises an adjust-type filter, an echo return loss enhancement device, a divergence detector and a double talk detector. The echo canceller is suitable for use between a receiving line and an output line. The receiving line has a terminal used as a first input terminal for an external input signal, and a terminal used as a first output terminal for an external output signal. The output line has a terminal used as a second input terminal for an acoustic input signal, and a terminal used as a second output terminal for an acoustic output signal.

The adjust-type filter is coupled between the first output terminal and the second input terminal to receive the external output terminal and to produce an echo cancellation signal after adjusting a coefficient of the echo canceller. The echo return loss enhancement device is coupled between the second input terminal and the second output terminal to output an adjusting signal according to the acoustic input signal and the acoustic output signal. In addition, a subtrator is coupled between the second input terminal, the second output terminal and the adjust-type filter to output the acoustic output signal after receiving the acoustic input signal and the echo cancellation signal. The divergence detector is coupled between the first input terminal and the echo return loss enhancement device to perform a divergence/convergence determination and to output a divergent/convergent signal after receiving the external input signal and the adjusting signal. The double talk detector is coupled to the first input terminal, the adjust-type filter, the echo return loss enhancement device and the divergence detector. While receiving the external input signal, the adjust signal and the divergent/convergent signal, the double talk detector outputs a control adjusting coefficient signal to the adjust-type filter.

In the above structure, the acoustic output signal includes a resulting signal by subtracting the acoustic input signal with the echo cancellation signal, while the second output terminal outputs an adjusting echo cancellation signal to control the cancellation signal of the adjust-type filter.

With the addition of the divergence detector to receive the external input signal and the adjust signal, so as to control the divergent/convergent signal input to the double detector, the vatiation of the coefficient of the echo canceller can be well controlled. In this manner, the previously divergent signal can be improved to be more convergent.

In addition, the adjust signal output by the echo return loss enhancement device is actually a ratio of the acoustic input signal to the acoustic output signal. While the adjust signal is smaller than a convergent constant, or the absolute value of the external input signal is smaller than an input constant, the control adjusting coefficient freezes the coefficient of the adjust-type filter, and the convergent constant is larger than 1.

On the other hand, for the divergence detector, while the absolute value of the external input signal is larger than the input constant, and the adjust signal is larger than the convergent constant, a convergent signal is output. In contrast, when the absolute value of the external input signal is larger than the input constant and the adjust signal is smaller than the divergent constant, a divergent signal is output. The divergent signal enables the control adjust coefficient signal output from the double talk detector to eliminate the coefficient of the adjust-type filter.

The invention further provides a method to cancel echo. The method is suitable for use between an external input signal, an external output signal, an acoustic input signal and an acoustic output signal.

An echo cancellation signal is produced to eliminate the effect of the mixing the acoustic input signal with the external output signal. According to the acoustic input signal and the acoustic output signal, an adjust signal is produced. A divergent/convergent signal is further produced according to the external input signal, the adjust signal and the divergent/convergent signal. According to the external input signal, the adjust signal and the divergent/convergent signal, a control adjusting coefficient signal is produced to control the echo cancellation signal. According to the acoustic input signal and the echo cancellation signal, the acoustic signal signal is output and an adjust echo cancellation signal is output to eliminate the echo cancellation signal.

Both the foregoing general description and the following detailed description are exemplary and explanatory only and are not restrictive of the invention, as claimed.

DESCRIPTION OF THE PREFERRED EMBODIMENTS

Figure 1:
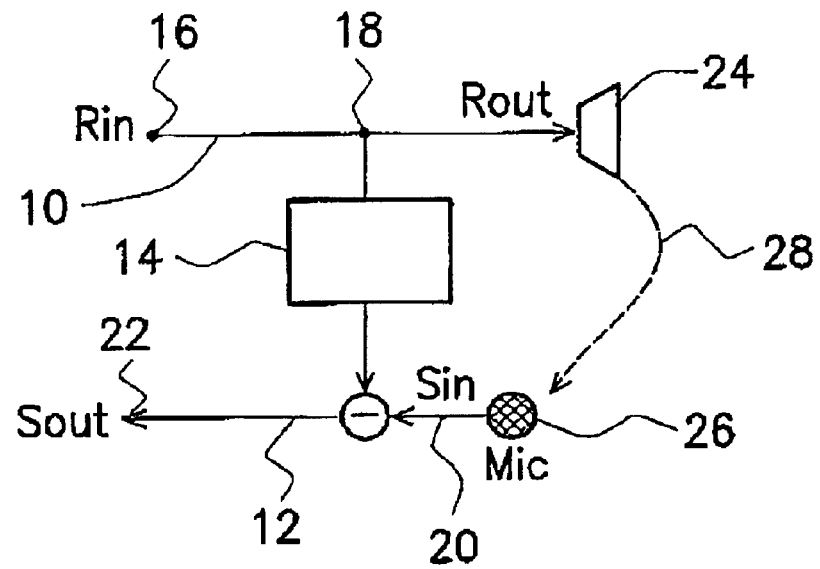
FIG. 1 shows a conventional echo canceller.
Figure 2:
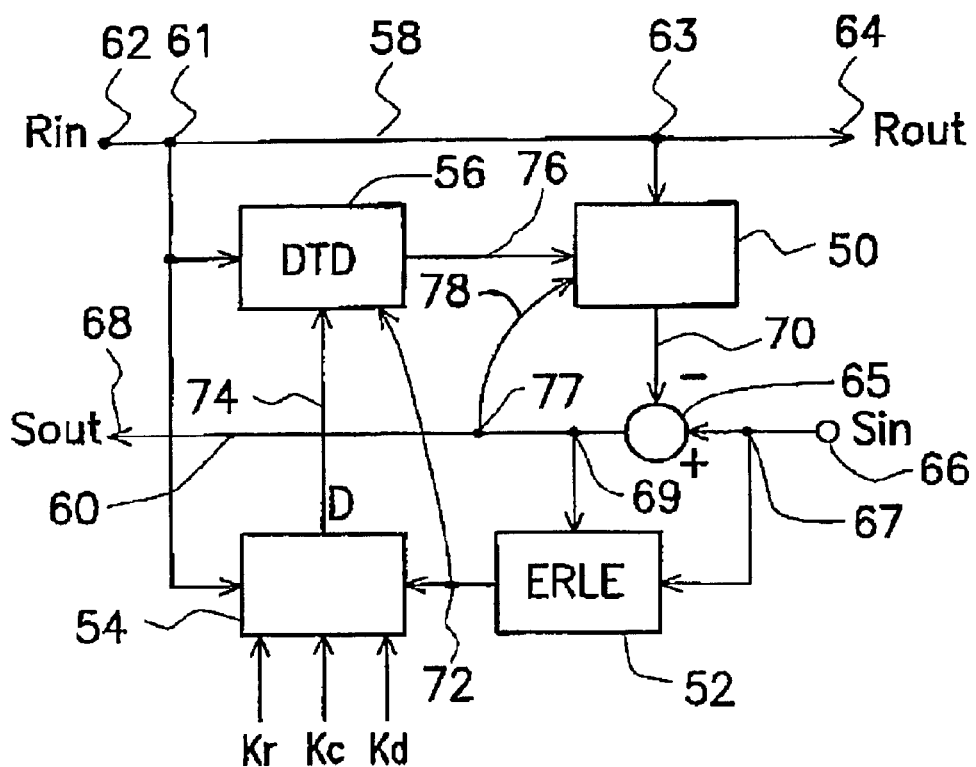
FIG. 2 shows a preferred embodiment of an echo canceller according to the invention.

A schematic diagram of an embodiment of an echo canceller according to the invention is shown in FIG. 2. In FIG. 2, the echo canceller comprises a adjust-type filter, an echo return loss enhancement device 52, a subtractor 65, a divergence detector 54 and a double talk detector 56.

The echo canceller is coupled between a receiving line (input line) 58 and an output line 60. The receiving line 58 comprises a terminal used as a first input terminal 62 to receive an external input signal Rin, and a terminal used as a first output terminal 64 used to output an external output signal Rout. The output line 60 comprises a terminal used as a second input terminal 66 to receive an acoustic input signal Sin and a terminal used as a second output terminal 68 to output an acoustic output signal Sout.

In the invention, the adjust-type filter 64 is coupled between the first input terminal 64 (at a node 63 extending from the first input terminal 64) and the second input terminal 66. The adjust-type filter 64 is to receive the external output signal Rout and to produce and output an echo cancellation signal 70 after adjusting an internal coefficient of the adjust-type filter 50.

The echo return loss enhancement device 52 (ERLE) is coupled between the second input terminal 66 (at a node 67 extending from the second input terminal 66) and the second output terminal 68 (at a node 69 extending from the second output terminal 68). According the acoustic input signal Sin and the acoustic output signal Sout, an adjust signal 72 is output from the ERLE device 50. For example, the value of the echo return loss enhancement is used as a reference for outputting the adjust signal 72. As mentioned above, the value of the ERLE is equal to a ratio of the acoustic input signal to the acoustic output signal Sout/Sin.

The subtractor 65 is coupled to the second input terminal 66, the second output terminal 68 and the adjust-type filter 50 to receive the acoustic input signal Sin and the echo cancellation signal 70, and then to output the acoustic output signal Sout.

The divergence detector 54 is coupled to the first input terminal 62 (at a node 61 extending from the first input terminal 62) and the ERLE device 52. After receiving the external input signal Rin and the adjust signal 72, a measure between convergence and divergence is performed, so that a divergent/convergent signal 74 is output (hereinafter, the divergent/convergent signal 74 is denoted as D).

The double talk detector 56 is coupled to the first input terminal 62 (at the node 61 extending from the first input terminal 62), the adjust-type filter 50, the ERLE device 52 and the divergence detector 54. After receiving the external input signal Rin, the adjust signal 72 and the divergent/convergent signal 74, the double talk detector (DTD) 56 outputs a control adjusting coefficient signal 76 to the adjust-type filter 50.

In FIG. 2, the acoustic output signal Sout through the subtractor 65 is obtained by subtracting the acoustic input signal Sin with the echo cancellation signal 70. Meanwhile, at the node 77 extending from the second output terminal 68, an adjusting echo cancellation signal 78 is output to control the echo cancellation signal 70 of the adjust-type filter 50.

In a normal situation, the double talk detector 56 outputs the control adjusting coefficient signal 76 to freeze the coefficient of the adjust-type filter while the absolute value of the external input signal Rin is smaller than an input constant kr ($|Rin|<kr$) or the adjust signal 72 (ERLE value) is smaller than a convergent constant kc. The convergent constant is larger than 1.

When the external input signal Rin has an absolute value larger than the input constant kr ($|Rin|>kr$) and the adjust signal 72 is larger than the convergent constant kc, the output divergent/convergent signal 74 (D) is a convergent signal (for example, D=0). When the absolute value of the external input signal Rin is larger than the input constant kr and the received adjust signal 72 is smaller than a convergent constant kd, the output divergent/convergent signal 74 is a divergent signal (for example, D=1). The divergent signal enables the double talk detector 56 output the control adjusting coefficient signal 76 to eliminate the coefficient of the adjust-type filter 50. The above divergent constant kd is smaller than 1.

While output divergent/convergent signal 74 is divergent (D=1), the adjust-type filter 50 thus divergent. This normally occurs when the echo environment has greatly changed, for example, while objects moving or open/close doors during the usage of the receiving set. Under this situation, the original double talk detector 56 is to be modified. When the divergent/convergent signal 74 is a divergent signal (D=1) and the external input signal Rin has an absolute value larger than the input constant kr, or when the divergent/convergent signal 74 is a convergent signal (D=0) and the original external input signal Rin has an absolute value smaller than the input constant kr, or when the adjust signal 72 is smaller than a convergent constant kc, the control adjusting coefficient signal 76 freezes the adjust-type filter 50.

When the divergent/convergent signal 74 is a divergent signal (D=1), the adjust signal 72 is not to be referred. Only the absolute value of the external input signal Rin can determine whether the coefficient of the adjust-type filter 50 is to be adjusted to gradually converge the coefficient. The divergent signal 74 is thus converged, and the double talk detector 56 is retrieved to a normal operation mode to stablize the echo canceller.

As a conclusion, the invention provides an echo canceller with the aid of the divergence detector. The divergent signal is converged to retrieve the double talk detector back to a normal operation mode, so as to stablize the echo canceller.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An echo canceller, suitable for use between a receiving line and an output line, wherein the receiving line has a first input terminal to receive an external input signal and a first output terminal to output an external output signal, while the output line has a second input terminal to receive an acoustic input signal and a second output terminal to output an acoustic output signal, the echo canceller comprising:

an adjust-type filter, coupled between the first output terminal and the second input terminal to receive the external output signal, and after adjusting a coefficient of the adjust-type filter, the adjust-type filter producing an echo cancellation signal to perform echo cancellation;

an echo return loss enhancement device, coupled between the second input terminal and the second output terminal to receive the external output signal and outputting an adjust signal according to the acoustic input signal and the acoustic output signal;

a subtractor, coupled between the second input terminal, the second output terminal and the adjust-type filter to receive the acoustic input signal and the echo cancellation signal, so as to output the acoustic output signal;

a divergent detector, coupled to the first input terminal and the echo return loss enhancement device to receive the external input signal and the adjust signal to perform a judgment between convergence and divergence, so as to output a divergent/convergent signal; and a double talk detector, coupled to the first input terminal, the adjust-type filter, the echo return loss enhancement device and the divergence detector, the double talk detector outputting a control adjusting coefficient signal to the adjust-type filter after receiving the external input signal, the adjust signal and the divergent/convergent signal;

wherein the second output terminal outputs an adjust echo cancellation signal to control the echo cancellation signal of the adjust-type filter, and wherein for the divergence detector, when the absolute value of the external input signal is larger than an input constant and the adjust signal is larger than a convergent constant, the divergent/convergent signal is convergent, when the absolute value of the external input signal is larger than the input constant and the adjust signal is smaller than a divergent constant, the divergent/convergent signal is divergent, the divergent, signal enabling the double talk detector outputting the control adjusting coefficient signal to cancel the coefficient of the adjust-type filter, and the divergent constant is smaller than 1.

2. The echo canceller according to claim 1, wherein the adjust signal output by the echo return loss enhancement device is a ratio of the acoustic input signal to the acoustic output signal.

3. The echo canceller according to claim 2, wherein for the double talk detector, the control adjusting coefficient signal freezes the coefficient of the adjust-type filter when the adjust signal is smaller than a convergent constant larger than 1.

4. The echo canceller according to claim 2, wherein for the double talk detector, the control adjusting coefficient signal freezes the coefficient of the adjust-type filter when the external input signal has an absolute value smaller than an input constant.

5. The echo canceller according to claim 1, wherein when the divergent/convergent signal is a divergent signal and the external output signal has an absolute value larger than the input constant, the control adjusting coefficient signal freezes the coefficient of the adjust-type filter.

6. The echo canceller according to claim 1, wherein when the divergent/convergent signal is a convergent signal and the external output signal has an absolute value smaller than the input constant, the control adjusting coefficient signal freezes the coefficient of the adjust type filter.

7. The echo canceller according to claim 1, wherein when the divergent/convergent signal is a convergent signal and the adjust signal is smaller than the convergent constant, the control adjust coefficient signal freezes the coefficient of the adjust-type filter.

8. The echo canceller according to claim 1, wherein the subtractor outputs the acoustic output signal by subtracting the acoustic input signal with the echo cancellation signal.

9. A method of canceling echo, used between an external input signal, an external output signal, an acoustic input signal and an acoustic output signal, the method comprising:

producing an echo cancellation signal to eliminate an influence upon the acoustic input signal by the external output signal;

producing an adjust signal according to the acoustic input signal and the acoustic output signal;

producing a divergent/convergent signal according to the external signal and the adjust signal;

producing a control adjusting coefficient signal to control the echo cancellation signal according to the external input signal, the adjust signal and the divergent/convergent signal; and outputting the acoustic output signal according to the acoustic input signal and the echo cancellation signal, and outputting an adjust echo cancellation signal to control the echo cancellation signal;

wherein when the external input signal has an absolute value larger than the input constant and the adjust signal is larger than the convergent constant, the divergent/convergent signal is a convergent signal, when the absolute value of the external input signal is larger than the input constant and the adjust signal is smaller than a divergent constant, the divergent/convergent signal is a divergent signal that enables the control adjusting coefficient signal to eliminated the echo cancellation signal, the divergent constant being smaller than 1.

10. The method according to claim 9, wherein the adjust signal is a ratio of the acoustic input signal to the acoustic output signal.

11. The method according to claim 10, wherein the control adjust coefficient signal freezes the cancellation signal when the adjust signal is smaller than a convergent constant that is larger than 1.

12. The method according to claim 10, wherein when the external input signal has an absolute value smaller than an input constant, the control adjust coefficient signal freezes the echo cancellation signal.

13. The method according to claim 9, when the divergent/convergent signal is a divergent signal and the absolute value of the external input signal is larger than the input constant, the control adjusting coefficient signal freezes the echo cancellation signal.

14. The method according to claim 9, wherein when the divergent/convergent signal is a convergent signal and the external input signal has an absolute value smaller than the input constant, the control adjust coefficient signal freezes the echo cancellation signal.

15. The method according to claim 9, wherein when the divergent/convergent signal is a convergent signal and the adjust signal is smaller than a convergent signal, the control adjust coefficient signal freezes the echo cancellation signal.

* * * * *